United States Patent [19]

Nebiker, Jr.

[11] 4,390,924
[45] Jun. 28, 1983

[54] VARIABLE CAPACITOR WITH GEAR TRAIN END STOP

[75] Inventor: Herman Nebiker, Jr., Cedar Rapids, Iowa

[73] Assignee: Rockwell International Corporation, El Segundo, Calif.

[21] Appl. No.: 262,735

[22] Filed: May 12, 1981

[51] Int. Cl.³ .............................................. H01G 5/01
[52] U.S. Cl. ..................................... 361/279; 188/68; 188/82.8; 192/142 A
[58] Field of Search ............................ 188/68, 82.8, 74; 192/142 A; 361/279, 289

[56] References Cited

U.S. PATENT DOCUMENTS

| | | | |
|---|---|---|---|
| 248,384 | 10/1881 | Baird | 188/82.8 |
| 2,266,237 | 12/1941 | Newell | 188/82.8 |
| 3,447,047 | 5/1969 | Lindsay | 361/289 |
| 3,756,565 | 9/1973 | Sakai | 188/82.8 |

Primary Examiner—Elliot A. Goldberg
Attorney, Agent, or Firm—Richard K. Robinson; Howard R. Greenberg; H. Fredrick Hamann

[57] ABSTRACT

An energy absorbing mechanical end stop for a high speed gear train that is used to drive a variable vacuum capacitor utilizes a friction plate that is mounted to a gear member of the high speed gear train as an energy absorbing mechanism. A wedge member is activated when the tuning of the variable vacuum capacitor approaches a limit and falls between the friction plate and the gear member to which the friction plate is attached. The friction between the friction plate and the wedge member brings the gear member to a stop without damaging the high speed gear train or the variable vacuum capacitor that is driven by the high speed gear train.

13 Claims, 3 Drawing Figures

VARIABLE CAPACITOR WITH GEAR TRAIN END STOP

BACKGROUND OF THE INVENTION

This invention relates to a mechanical end stop for a high speed gear train and in particular to an energy absorbing mechanical end stop for a high speed gear train used to drive a variable vacuum capacitor.

Radio transmitters which are capable of broadcasting over multiple bands often require tunable filtering circuits that can be rapidly tuned. An example of one such filtering circuit is that of an antenna coupler that interfaces the output of the radio transmitter with the antenna. This type of filtering circuit must be able to pass energy in the kilowatt range. In general, variable vacuum capacitors are the tuning elements associated with the tunable filters that are tunable and also meet the necessary power requirements. Variable vacuum capacitors are often motor driven and because there is usually a very short period of time to change frequencies, the filtering circuit must be tuned at a high rate of speed. In the case where there is a requirement to go from one extreme of capacitance to another extreme of capacitance such as varying from maximum capacitance to minimum or vice versa, the gear mechanism that is used to interface the motor with the variable vacuum capacitor often has associated with it momentum due to the tuning speeds and usually continues turning after the removal of power from the motor that drives the gear train and varies the capacitance. In the prior art to prevent over driving the capacitor and damaging the variable vacuum capacitor a post was used to stop the gear train at either the upper limit or the lower limit and thus, protect the variable vacuum capacitor. However, the gear train was subject to damaging forces when brought to a sudden and instantaneous stop.

SUMMARY OF THE INVENTION

An energy absorbing mechanical end stop for a high speed gear train that is used to drive a variable vacuum capacitor utilizes a friction plate that is mounted to a gear member of the high speed gear train as an energy absorbing mechanism. A wedge member is activated when the tuning of the variable vacuum capacitor approaches a limit and falls between the friction plate and the gear member to which the friction plate is attached. The friction between the friction plate and the wedge member brings the gear member to a stop without damaging the high speed gear train or the variable vacuum capacitor that is driven by the high speed gear train.

There are two embodiments of the invention shown which provide different apparatuses for the placement of the wedge member between the friction plate and the gear member upon which the friction plate is mounted. One embodiment utilizes a gear driven cam that will lower the wedge member into the position when either the maximum or minimum limit of the variable vacuum capacitor is approached.

An alternate embodiment provides a limit switch, that senses when the variable vacuum capacitor approaches a limit and upon detecting of one of the variable vacuum capacitor's limits activates a solenoid which is connected to the wedge member and when activated will insert the wedge member between the friction plate and the gear upon which the friction plate is mounted.

It is an object of this invention to provide a mechanical end stop for a motor driven variable vacuum capacitor that will prevent the variable vacuum capacitor from being over driven.

It is another objective of the invention to provide a mechanical end stop for a motor driven variable vacuum capacitor that is energy absorbing.

It is yet another objective of the invention to provide a mechanical end stop for a motor driven variable vacuum capacitor that will effectively stop the high speed gear train that interfaces the drive motor to the variable vacuum capacitor without damaging the motor, high speed gear train or the variable vacuum capacitor.

BRIEF DESCRIPTION OF THE FIGURES

Many advantages of the present invention may be ascertained from a reading of the specification and the claims in conjunction with the figures in which:

DETAILED DESCRIPTION OF THE PREFERRED EMBODIMENT

Figure 1:
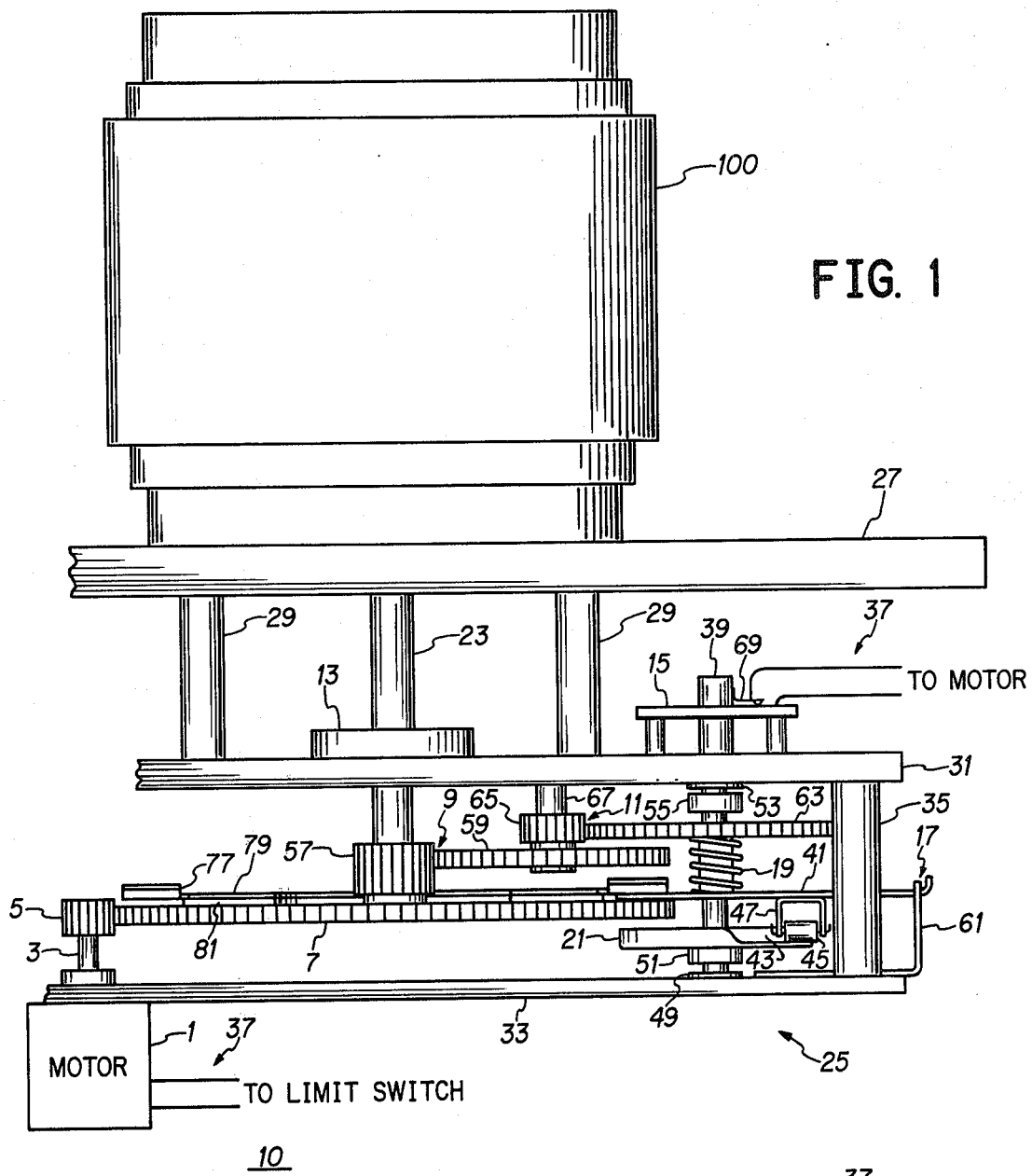
FIG. 1 is a side assembly view of the motor driven variable vacuum capacitor according to the invention.

FIG. 1, to which reference should now be made, there is shown a motor driven variable vacuum capacitor 10 that includes a variable vacuum capacitor 100 that is driven by a motor and gear assembly 25.

The variable vacuum capacitor 100 is mounted on a capacitor mounting flange 27 which is connected to the motor and gear assembly 25 by spacer and support members 29 which are joined to a gear mounting flange 31 that is a part of the motor and gear assembly 25. The motor 1 is mounted to a motor mounting flange 33 which in turn is connected to the gear mounting flange 31 by a motor support member 35.

The motor pinion 5, when tuning is required, causes tuning shaft 23 to rotate by the operation of the drive shaft 3 driving the motor pinion 5 which in turn causes the drive gear 7 to rotate, rotating the tuning shaft 23 and varying the capacitance of the variable vacuum capacitor 100. A bushing 13 supports the tuning shaft 23 during this operation and a limit switch 15 detects when the variable vacuum capacitor 100 is approaching either the minimum capacitance (min) limit or the maximum capacitance (max) limit and will disable the motor 1 via conductors 37. In the preferred embodiment, the variable vacuum capacitor 100 requires more than one rotation of the tuning shaft 23 to cover all capacitance between the min and max limits in fact, in the preferred embodiment one rotation of the tuning shaft 23 only covers approximately 10% of the total capacitance range and consequently, a first reducing gear set 9 and a second reducing gear set 11 are used to drive the limit switch 15. Thus, one rotation of the limit switch 15 covers the full range of the variable vacuum capacitor 100. Idler shaft 39 drives the limit switch 15 and cam 21 which is driven by the second recuding gear set 11. The cam 21 lowers into place a wedge member 41 when the variable vacuum capacitor 100 is driven to one of its limits. Notch 43 in the cam 21 indicates, given proper alignment, when the variable vacuum capacitor 100 has reached its min or max limits.

There is a roller 45 that rides on the top surface of the cam 21 and is mounted to the wedge member by a bracket 47. The wedge member 41 pivots around pivotal point 17 and a spring 19 maintains a positive force against the wedge member 41 so that the cam 21 determines the position of the wedge member 41 either in the raised position or in the lower position depending on the portion of the cam 21 that is under the roller 45. Mount bracket 61 supports the pivotal point 17 and the pivotal end of the wedge member 41. The idler shaft 39 is held in place by and end bushing 49 and feed-through bushing 53. Collars 51 and 55 are required to adjust the drive gear 63 and the cam 21 for proper alignment and timing.

The first reducing gear set 9 includes a first reducing gear set pinion 57 that drives a first reducing set drive gear 59. The first reducing set drive gear is connected to drive a reducing idler shaft 67 which also drives a second reducing gear set pinion 65. The second reducing gear set pinion 65 drives the second reducing set drive gear 63 which in turn causes the idler shaft 39 to rotate, rotating the wiper arm 69 of the limit switch 15 as well as rotating cam 21.

When the gear train is rotating and the notch 43 is under the roller 45, the wedge member 41 is lowered and is guided by a ramp 77 between the friction plate 79 and drive gear 7. A spacer 81 establishes the clearance between the friction plate 79 and the drive gear 7. To be effective, the clearance between the friction plate 79 and the drive gear 7 must be equal to or less than the thickness of that part of wedge member 41 that sides under the friction plate 79.

The limit switch 15 is electrically connected to the motor 1 by conductor 37 and will remove power from the motor 1 when the variable vacuum capacitor 100 has reached a limit.

Figure 2:
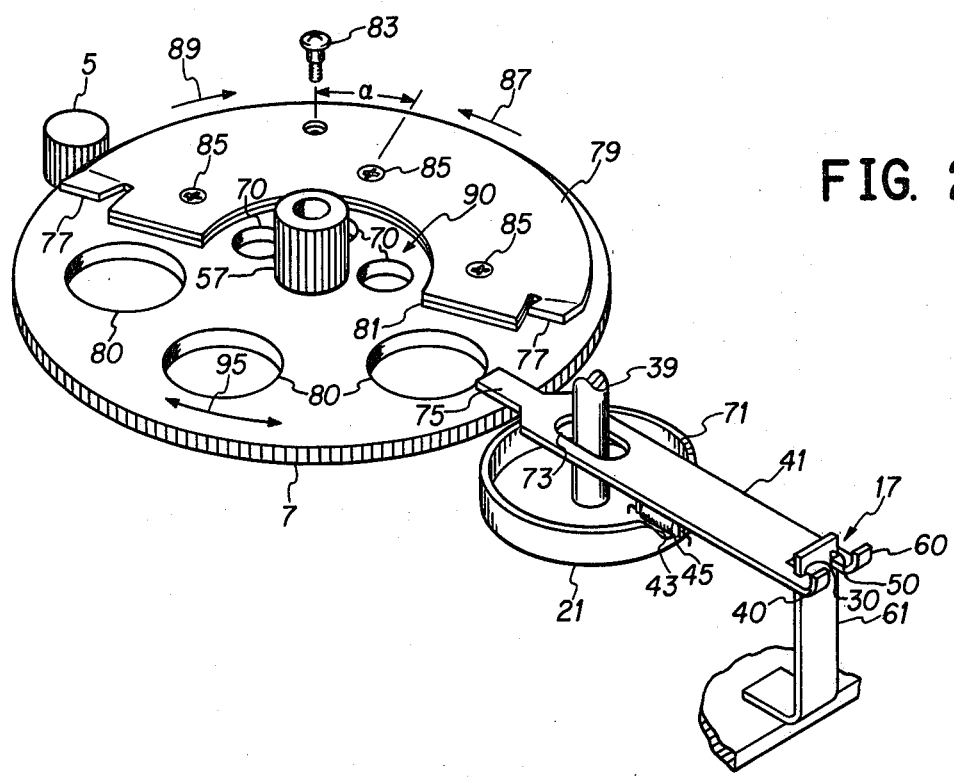
FIG. 2 is an isometric view of the energy absorbing end stop according to the invention.

An isometric view of the brake mechanism is provided in FIG. 2 to which reference should now be made. The drive gear 7 that is driven by pinion 5 is a bidirectional drive gear as indicated by the bidirectional arrow 95. Mounted on the top surface of the drive gear 7 is the friction plate 79 which in the preferred embodiment is of a flexible material, shape as a half disc; that is secured to the drive gear 7 by means of fastners 85. Spacer 81 provides clearance between the drive gear 7 and the friction plate 79 to receive a bidirectional wedge 75 which is part of the wedge member 41. The thickness of the spacer 81 should be equal to, or as in the preferred embodiment, less than the thickness of the bidirectional wedge 75 so that the friction that is generated between the friction plate and the wedge member and the top surface of the drive gear 7 is enhanced by spring forces associated with the flexible friction plate 79, and thus the energy associated with the momentum of the drive gear 7 that was built up due to drive gear 7 being driven at a high rate of speed by pinion 5 is dissipated before the bidirectional wedge 75 comes in contact with the pin 83. The friction plate 79 and the spacer 81 are both half disc with open centers whose outer parameter are semicircular and whose centers, that point either real or imaginary where all radial lines drawn from the outer circumference meet, are in alignment with the center point of the drive gear 7. Opening 90 provides clearance for the first reducing set pinion 57. The radius of the friction plate 79 is generally less than the radius of the drive gear 7 to prevent interference with the mating of the pinion 5 with drive gear 7. The radius of the spacer 81 is less than the radius of the friction plate 79. The difference between the radii enables the bidirectional wedge 75 to fit between the friction plate 79 and the drive gear 7. This same difference also is the approximate width of the ramp 77. Although the width of the ramp 77 needs only be wide enough to guide the bidirectional wedge 75 into the space between the friction plate 79 and the drive gear 7, the difference, in the preferred embodiment, between the radius of the friction plate 79 and spacer 81 is the approximate width of ramp 77.

The energy absorbing end stop is primarily used to dissipate the energy representative of the momentum of the gear resulting from driving the drive gear train at high speeds. Therefore, to reduce the momentum there are holes 80 drilled into the drive gear 7 and the drive gear 7, the friction plate 79 and the spacer 81 are all made of aluminum, in the preferred embodiment. Balancing is provided by the drilling of additional holes 70 on that portion of the drive gear 7 over which the spacer 81 and friction plate 79 are mounted.

The roller 45 in the raised position rides along a surface 71 on the cam 21. However, when the lower surface in notch 43 is under the roller 45, the wedge member 41 is lowered so that the bidirectional wedge 75 is in position to slide under the ramp 77, and to cause the slowing of the drive gear 7 due to the friction that exists between the friction plate 79 and the bidirectional wedge 75 and between the bidirectional wedge and the drive gear 7.

As was discussed earlier the drive gear 7 rotates in both clockwise direction as indicated by the arrow 89 and in the counterclockwise direction indicated by arrow 87. The variable vacuum capacitor assists in the changing of the capacitance when the tuning is in the counterclockwise direction as indicated by counterclockwise direction arrow 87 and resists tuning in the clockwise direction as indicated by arrow 89. Therefore, when tuning requires the rotation of the drive gear 7 in the counter clockwise direction, the bidirectional wedge 75 has a greater distance to travel before reaching the end stop screw 83 than it does in the clockwise direction, this greater distance is indicated by the angle alpha.

The slot 73 allows the wedge member 41 to move up and down without binding or being bound by the idler shaft 39.

The surface 71 of the cam 21 and the angle of the section in which the notch 43 is located also represents the conductive and nonconductive state of the limit switch 15. In other words, the limit switch 15, depending on the application, either must be making electrical contact during the period of time that the roller 45 is in the notch 43 or alternatively if a different configuration is used it must be open during that period of time. In any event, the operation of the limit switch 15 is such that power is removed from the motor when the roller 45 is in the notch 43.

The end stop screw 83 acts as a safety protection against damaging of the variable vacuum capacitor 100 by providing an end stop for the bidirectional wedge 75 in the event friction provided by the friction plate 79 and the drive gear 7 is not sufficient to stop the rotation of the drive gear 7, and thus prevents the varying of the capacitance of the variable vacuum capacitor 100 once a limit has been reached.

The pivotal point 17 includes two fork prongs 60 and 40 on the end of the wedge member 41 mounted in notches 50 and 30 respectively, located on the mounting bracket 61. The fork prongs 60 and 40 have turned up ends to prevent them from becoming dislodged from the notches 50 and 30 during the moment of the wedge member 41.

Figure 3:
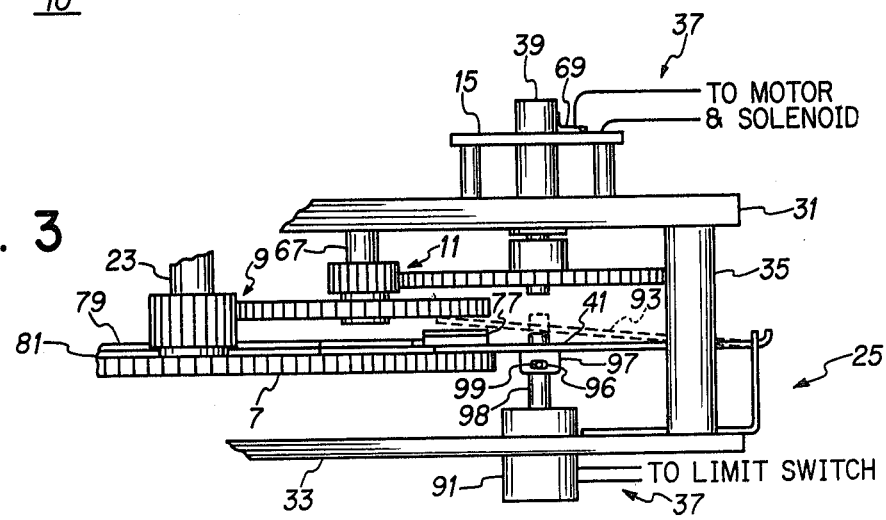
FIG. 3 is a partially sectioned side assembly view of an alternate embodiment of the invention.

FIG. 3 to which reference should now be made, is a partially sectioned side assembly view of an alternate embodiment of the motor and gear assembly 25. A spring loaded solenoid 91 controls the positioning of the wedge member 41 which is shown in a position to engage the ramp 77, and thus be caught in the space between the friction plate 79 and the drive gear 7 that is established by the spacer 81. Dotted lines 93 illustrate the raised position of the wedge member 41 when it is in the position that the wedge member 41 normally is in while tuning of the variable vacuum capacitor 100 is in progress. When the limit switch 15 detects a limit, the solenoid is activated to lower the wedge member 41 into the position illustrated in FIG. 3 where it will become engaged in the space that is established by the spacer 81 between the friction plate 79 and the drive gear 7. Collar 97 mates the wedge member 41 to the solenoid shaft 98 and the pin 99 that holds the shaft 98 to the collar 97. Slot 96 provides for movement of the pin 99 that occurs when the wedge member 41 is raised to the position represented by dotted lines 93.

Conductors 37 in this embodiment, not only are connected to the motor 1 but are also used to activate the spring loaded solenoid 91 to lower the wedge member 41 into position to engage the ramp 77 when the limit switch 15 detects that the tuning capacitor has approached one of its limits, either the max or min limit.

Although the invention was directed of a high speed gear train for tuning of a variable vacuum capacitor, it is obvious from the above description that the invention could readily be applied to many other types of gear trains.

Many changes and modifications in the above described embodiments of the invention can of course, be carried out without departing from the scope, thereof. Accordingly, the invention is disclosed and is intended to be limited only by the scope of the appended claims.

I claim:

1. In combination, a variable vacuum capacitor with a tuning shaft connected to a motor driven drive train for rotating the tuning shaft varying the capacitance of the variable vacuum capacitor thereby, the motor driven drive train having at least a first drive means and an energy absorbing means comprising;
   a friction plate;
   a mounting means for mounting the friction plate to the first drive means and separating the mounted friction plate from first drive means by first predetermined distance;
   a wedge member of a thickness that is at least equal to the first predetermined distance; and
   activate means for placing the wedge member between the friction plate and the drive means so that, when the first drive means is rotating and the wedge member is placed betweeen the friction plate and the first drive means, the friction between the wedge member and the friction plate acts to retard the rotation of the first drive means.

2. The energy absorbing mechanical means according to claim 1 wherein the first drive means comprises;
   a pinion;
   a motor with a drive shaft mounted to the pinion; and
   the first drive means being a gear that interfaces to the pinion and the tuning shaft so that for every 360° travel by the first drive means the tuning shaft travels 360°.

3. The energy absorbing mechanical means according to claims 1 or 2 wherein the friction plate and the mounting means comprises;
   a metal plate shape as a half disc with a radius that is less than the radius of the first drive means;
   a spacer plate having the shape of a half disc with a radius that is less than the friction plate; and
   fastner means for securing the friction plate, and spacer plate to the first drive means such that there centers of the friction plate, spacer plate and drive metal are in alignment and a clearance is provided between the outer parameter of the spacer plate and the outer parameter of the friction plate for passage of the wedge member.

4. The energy absorbing mechanical means according to claim 1 wherein the friction plate and the mounting means comprise;
   a first plate made of a flexible metal to serve as the friction plate;
   a second plate of a thickness less than the thickness than the wedge member such that when the first plate is mounted on the second plate the first plate when the wedge member is in place between the first plate and the first drive means the spring forces associated with the flexible metal that the first plate is made of enhances the friction to the surface of the wedge member that is in contact with the first plate.

5. The energy absorbing mechanical means according to claim 4 wherein the first plate further comprises;
   a ramp surface along the radius of the first plate that has a width from the outer circumference of the first plate to the outer circumference of the second plate when both the first plate and the second plate are mounted on the first drive means.

6. The energy absorbing mechanical means according to claims 1 or 2 wherein the activate means comprises;
   a fist idler shaft;
   a converting gear train means for converting the number of turns made by the first drive means to tune the variable vacuum capacitors between a minimum limit and maximum limit into a single revolution as represented by a single turn of the first idler shaft;
   a cam means mounted to the first idler shaft having a first surface and a second surface with the first surface being higher than the second surface; and
   caster means mounted to the wedge member and in alignment so that the caster means on the first surface and the second surface causing the wedge member to be in an elevated position when the caster means on the first surface and to be in nonelevated position when the caster rides on the second surface so that the wedge member will become engaged with the friction plate when the caster rides along the second surface.

7. The energy absorbing mechanical means according to claim 6 further comprising;
   a limit switch driven by the first idler shaft for removing power from the motor when the variable vacuum tuning capacitor is tuned to a limit.

8. The energy absorbing mechanical means according to claims 1 or 2 wherein the activate means comprises;
   a first idler shaft;
   a converting gear train means for converting the number of turns made by the first drive means to tune the variable vacuum capacitor between a maximum limit and a minimum limit into a single revolution as represented by a single turn of the first idler shaft;

a limit switch driven by the first idler arm for removing power from the motor when the variable vacuum capacitor is tuned to a limit;

a solenoid means activates by the limit switch and connected to the wedge member for placing the wedge member between the friction plate and the drive means.

9. A drive train having at least a first drive means and an energy absorbing means comprising an end stop;

a friction plate;

a mounting means for mounting the friction plate to the first drive means and separating the mounted friction plate from the first drive means by first predetermined distance;

a wedge member of a thickness that is at least equal to the first predetermined distance; and activate means for placing the wedge member between the friction plate in the drive means so that, when the first drive means is rotating and the wedge member is placed between the friction plate and the first drive means, the friction between the wedge member and the friction plate acts to retard the rotation of the first drive means.

10. The energy absorbing means according to claim 9, wherein the first drive means comprises;

a pinion;

a motor with a drive shaft mounted to the pinion;

the first drive means being a gear that interfaces with the pinion.

11. The energy absorbing means according to claims 9 and 10 wherein the friction plate and the mounting means comprises;

a metal plate shape as a half disc with a radius that is less than the radius of the first drive means;

a spacer plate having the shape of a half disc with a radius that is less than the friction plate; and fastener means for securing the friction plate spacer plate to the first drive means such that the centers are in alignment and a clearance is provided between the outer parameter of the spacer plate and the outer parameter of the friction plate for passage of the wedge member.

12. The energy absorbing means according to claim 9 wherein the friction plate and the mounting means comprise;

a first plate made of a flexible metal to serve as the friction plate;

a second plate of a thickness less than the thickness than the wedge member such that when the first plate is mounted on the second plate the first plate when the wedge member is in place between the first plate and the first drive means the spring forces associated with the flexible metal that the first plate is made of enhances the friction to the surface of the wedge member that is in contact with the first plate.

13. The energy absorbing means according to claim 12 wherein the first plate further comprises;

a ramp surface along the radius of the first plate that has a width from the outer circumference of the first plate to the outer circumference of the second plate when both the first plate and the second plate are mounted on the first drive means.

* * * * *